United States Patent
Rix et al.

(10) Patent No.: US 7,050,924 B2
(45) Date of Patent: May 23, 2006

(54) TEST SIGNALLING

(75) Inventors: Antony W Rix, Cambridge (GB); Philip Gray, Ipswich (GB); Richard J B Reynolds, Ipswich (GB); Michael P Hollier, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 10/276,711

(22) PCT Filed: May 25, 2001

(86) PCT No.: PCT/GB01/02334

§ 371 (c)(1),
(2), (4) Date: Nov. 18, 2002

(87) PCT Pub. No.: WO01/97414

PCT Pub. Date: Dec. 20, 2001

(65) Prior Publication Data

US 2003/0156633 A1 Aug. 21, 2003

(30) Foreign Application Priority Data

Jun. 12, 2000 (EP) .................................. 00304945

(51) Int. Cl.
*H04B 17/00* (2006.01)

(52) U.S. Cl. ...................... 702/124; 702/189; 704/220

(58) Field of Classification Search ................ 702/122, 702/124–126, 182–183, 186, 189; 704/201, 704/205–206, 220–221, 223, 229–230; 703/5; 367/73

See application file for complete search history.

(56) References Cited

U.S. PATENT DOCUMENTS 5,621,854 A   4/1997   Hollier .................... 704/200.1

(Continued)

FOREIGN PATENT DOCUMENTS

DE   4324292   2/1995

(Continued)

OTHER PUBLICATIONS

Rix et al., "The perceptual analysis measurement system for robust end-to-end speech quality assessment", Jun. 2000, Acoustics, Speech, and Signal Processing, 2000. ICASSP '00. Proceedings. 2000 IEEE International Conference on, vol. 3, 1515-1518.*

* cited by examiner

*Primary Examiner*—Marc S. Hoff
*Assistant Examiner*—Mary Catherine Baran
(74) *Attorney, Agent, or Firm*—Nixon & Vanderhye P.C.

(57) ABSTRACT

The perceptibility of degradations caused to signals transmitted over a transmission medium is measured by generating one or more predetermined transmission degradation conditions ($e_t$) and subjecting a test signal ($S_t$) to the transmission degradation conditions ($e_t$) in a network simulation device. The degree M(e) to which the or each transmission degradation condition ($e_t$) is perceptible to the human perceptual system is measured and a data set is generated and stored for converting one or more transmission degradation conditions ($e_t$) to respective values of perceptibility M(e). The data set may be a look-up table or an empirically determined formula. The data set may then be used on live traffic (S'), by identifying objectively measured transmission degradation conditions (e) in the received signal (S') and retrieving from the data set in the data storage means (7) a value of perceptibility (M) associated with the transmission degradation conditions (e) so identified. In this way a measure of the subjective significance of degradation in the signal (S') can be derived from objective measures of degradation.

12 Claims, 2 Drawing Sheets

U.S. PATENT DOCUMENTS

| | | | |
|---|---|---|---|
| 5,799,272 A * | 8/1998 | Zhu | 704/223 |
| 5,848,384 A | 12/1998 | Hollier et al. | 704/231 |
| 5,890,104 A | 3/1999 | Hollier | 704/201 |
| 5,940,792 A | 8/1999 | Hollier | 704/228 |
| 5,999,900 A | 12/1999 | Hollier | 704/228 |
| 6,035,270 A | 3/2000 | Hollier et al. | 704/202 |
| 6,219,634 B1 * | 4/2001 | Levine | 704/200.1 |
| 6,240,385 B1 * | 5/2001 | Foodeei | 704/220 |
| 6,246,345 B1 * | 6/2001 | Davidson et al. | 341/51 |
| 6,363,338 B1 * | 3/2002 | Ubale et al. | 704/200.1 |
| 6,377,917 B1 * | 4/2002 | Gimenez de los Galanes et al. | 704/220 |
| 6,421,350 B1 * | 7/2002 | Szurkowski et al. | 370/419 |
| 6,633,841 B1 * | 10/2003 | Thyssen et al. | 704/233 |
| 6,647,366 B1 * | 11/2003 | Wang et al. | 704/201 |
| 2003/0092394 A1 | 5/2003 | Gray et al. | 455/67.14 |

FOREIGN PATENT DOCUMENTS

| | | |
|---|---|---|
| EP | 647375 | 4/1995 |
| EP | 705501 | 4/1996 |
| WO | WO96/06495 | 2/1996 |
| WO | WO9606496 | 2/1996 |
| WO | WO97/05730 | 2/1997 |
| WO | WO01/93470 | 12/2001 |

TEST SIGNALLING

This application is the US national phase of international application PCT/GB01/02334 filed 25 May 2001 which designated the U.S.

FIELD OF THE INVENTION

This invention relates to the assessment of the condition of telecommunications systems whilst in use.

BACKGROUND OF THE INVENTION

Signals carried over telecommunications links can undergo considerable transformation, such as digitisation, data compression, data reduction, amplification, and so on. Further distortions can be caused by electromagnetic interference from external sources.

Objective processes for the purpose of measuring the quality of a signal are currently under development and are of application in prototype testing, pre-delivery testing of components, and in-service testing of installed equipment. They are most commonly used in telephony, but are also of application in other systems used for carrying speech signals, for example public-address systems.

The present applicant has a number of patents and applications relating to this technical field, most particularly European Patent 0647375, granted on 14 Oct. 1998, and its foreign equivalents. In this invention, two initially identical copies of a test signal are used. A first copy is transmitted over the communications system under test. The resulting signal, which may have been degraded by the system under test, is compared with a reference copy of the same signal, which has not passed through the system under test, to identify audible errors in the degraded signal. These audible errors are assessed to determine their perceptual significance that is, errors of types which are considered significant by human listeners are given greater weight than are those which are not considered so significant. In particular, inaudible errors, being perceptually irrelevant and therefore unnecessary for assessment, are disregarded.

The automated system provides an output comparable to subjective quality measures originally devised for use with human subjects. More specifically, it generates two values, $Y_{LE}$ and $Y_{LQ}$, equivalent to the "Mean Opinion Scores" (MOS) for "listening effort" and "listening quality", which would be given by a panel of human listeners when listening to the same signal. The use of an automated system allows for more consistent assessment than human assessors could achieve, and also allows the use of compressed and simplified test sequences, which give spurious results when used with human assessors because such sequences do not convey intelligible content.

Different errors may have different perceptual significance in different languages, according to the use of different phonemes, and their relative frequencies of occurrence, in different languages. Multilingual test sequences are also more readily accommodated in automated systems than those using human subjects, as the human subjects would need to be familiar with all the languages represented in the test signal, again to avoid spurious results caused by any lack of intelligibility to the listener.

An auditory transform of each signal is taken, to emulate the response of the human auditory system (ear and brain) to sound. The degraded signal is then compared with the reference signal in the perceptual domain, in which the subjective quality that would be perceived by a listener using the network is determined from parameters extracted from the transforms.

Such automated systems require a known (reference) signal to be played through a distorting system (the telephone network) to derive a degraded signal, which is compared with an undistorted version of the reference signal. Such systems are known as "intrusive" measurement systems, because whilst the test is carried out the system under test cannot carry live (revenue-earning) traffic.

A suitable test signal is disclosed in European Patent Specification 0705501 and comprises a sequence of speech-like sounds, selected to be representative of the different types of phonetic sounds that the system under test may have to handle, presented in a predetermined sequence. The sounds are selected such that typical transitions between individual phonetic elements are represented. Typical speech comprises a sequence of utterances separated by silent periods, as the speaker pauses to breathe, or listens to the other party to the conversation. These silent periods, and the transitions between utterances and silent periods, are also modelled by the test signal.

The arrangement described above requires the use of a pre-arranged test sequence, which means it cannot be used on a live telecommunications link—that is, a link currently in use for revenue-earning traffic—because the test sequence would interfere with the traffic being carried and be audible to the users, and because conversely the live traffic itself (whose content cannot be predetermined) would be detected by the test equipment as distortion of the test signal.

In order to carry out tests on equipment in use, without interfering with the revenue-earning traffic being carried by the equipment (so-called non-intrusive testing), proposals have been made to use the live speech signals themselves as the test signals. This can be achieved quite simply if an undegraded copy of the original signal is available at the point of measurement. In test conditions it is, of course, possible to place the transmitter and receiver in close proximity, but this is impossible when testing an in-service long-distance link. In a real situation any reference signal is likely to be subject to similar degradation to that experienced by the link under test, unless a significant error correction overhead is provided to ensure that the reference copy is itself received undegraded.

German Patent Specification 4324292 (DeTeCon) of 1995 discloses a system in which an empirical relationship is determined between an objective measure (such as bit-error rate) and a subjective measure (that is, one made by human subjects), such as Mean Opinion Score. This derived relationship is then used to estimate the subjective quality of a received signal from an objective measure made of the live network. For this arrangement to produce reliable results sufficient repetitions of each subjective test must be made to provide a statistically reliable value for the Mean Opinion Score. Such a system is not practical for any but the simplest of systems. The search space for determining an accurate relationship between an objective measure such as packet statistics and a subjective measure of speech quality is very large. To determine a person's opinion of speech quality needs several seconds of speech to analyse. However, it can take many days or even weeks to analyse the objective speech properties and assess them relative to the subjective values reported by the human subjects. Should a particular property, or range of values of a given property, prove to be of particular interest (perhaps because of a large variation in subjective value for a small change in objective value) it is rarely practical to repeat the tests with a greater definition, as the same human subjects may not be available or may give less consistent responses (for health or other reasons) when the test is repeated, perhaps several weeks after the original test. Any complex system comprises a large number of network elements, each having a variety of possible behaviours, which will interact with each other. It would not be practicable to perform subjective tests using human subjects for more than a small proportion of the possible network behaviours. Furthermore, in a packet switching system each individual data packet may be transmitted by a different route, using different network elements. Since degradation will in general be different for each such route, the effect on the complete message will be much more difficult to assess.

The present Applicant's Internationl Patent specifications WO96/06495 and WO96/06496 (both published on 29 Feb. 1996), and WO97/05730 (published 13 Feb. 1997) propose three other possible solutions to this problem. WO96/06495 describes the analysis of certain characteristics of speech which are talker-independent in order to determine how the signal has been modified by the telecommunications link. In WO96/06496, the content of a received signal is analysed by a speech recogniser and the results of this analysis are processed by a speech synthesiser to regenerate a speech signal having no distortions. WO97/05730 discloses a process in which the received signal is compared with parameters identifying speech-like and non-speech like characteristics, to derive a measurement of the quality of the signal. However, all of these techniques require considerable processing power, making it difficult to monitor signal quality in real time, and the processes all require some assumptions to be made about the incoming signal.

A further proposal, disclosed in the Applicant company's International Patent Application PCT/GB01/02050 filed on May 10, 2001 provides a method using the simpler "intrusive" measurement techniques in a non-intrusive manner on a communications channel which is carrying a live call, intended for use for voice communication systems, in which there are normally gaps in the speech content. A predetermined test signal is transmitted over the communications link during such gaps, and compared at the remote end with a reference copy of the signal. However, this system is only suitable for systems in which there are suitable gaps in the information content. It is not suitable for systems in which such gaps are used for other purposes, such as carrying data or other voice calls, or for "half-duplex" systems in which both directions of conversation use the same channel.

SUMMARY OF THE INVENTION

According to the present invention, there is provided a method of measuring the perceptibility of degradations caused to signals transmitted over a transmission medium comprising the steps of:
generating a test signal;
generating one or more predetermined transmission degradation conditions;
subjecting the test signal to the or each transmission degradation condition;
using an objective measure to determine the degree to which the or each transmission degradation condition is perceptible to the human perceptual system;
generating therefrom a data set for converting transmission degradation conditions into values of perceptibility; and
storing the data set so generated.

An objective measurement system suitable for the purpose is the "Perceptual Analysis Measurement System" (PAMS) disclosed in the present applicant's European patent 0647375, and available from Psytechnics Ltd of Ipswich, UK.

To use the data set so stored, the method may comprise the further steps of:
receiving a signal from a transmission medium;
identifying transmission degradation conditions in the received signal;
retrieving from the stored data set a value of perceptibility associated with the transmission degradation condition so identified;
thereby generating a measure of the perceptibility of the degradation in the received signal.

By using an objective system it is possible to automate the calibration process, making it simpler and more reliable than the subjective methods used in the prior art reference. The transmission degradation conditions may include values of bit error rate, packet delay variation, packet loss characteristics, or other conditions. These can be simulated using a network emulator.

The data set may be stored in the form of a "look-up table" or preferably as an empirical relationship, determined using "best-fit" techniques, between the error conditions e and associated objectively-measured estimates of subjective error values M(e), so that the subjective error M(e) is defined as a mathematical function of the measured values of packet loss, jitter etc.

In a preferred arrangement values of perceptibility are selected according to the nature of elements of the transmission path located before and after the transmission medium under test.

In a further embodiment, the objective speech quality measure is used to improve the efficiency of search of the test space, by imposing an initial plurality of degradation conditions on the system, and then selecting further degradation conditions according to the degree of variation in the resulting perceptibility measurement value. The system can be used to identify values of objective properties for which a predetermined variation in value generates relatively large differences in the resulting perceptibility measurement values, and performs additional measurements of such properties for neighbouring values. Conversely, if the speech quality measures are showing little difference between conditions then the degree of variation can be increased. The system may also perform tests between the incremental steps to identify local maxima and minima. Thus, the immediateness of the objective perceptual speech measure can be used to improve calibration efficiency.

As an example, a test is performed on a specified network condition, and the speech quality is then immediately calculated. The network condition parameters are then altered by an adjustment factor, and the quality calculated again. This process continues and if the quality score differs by an amount greater than a defined threshold, over a specified number of measurements, the tester reduces the adjustment factor. The tester may also retrack through the condition settings which showed the large variation with the new adjustment factor.

Apparatus suitable for performing these methods form further aspects of the invention.

The invention analyses the degradation of the actual signal being transmitted, rather than of a test signal as in the Applicant company's earlier application PCT/GB01/02050 mentioned above. However, the requirement for calibration means that this invention will only respond to fault conditions for which it has been calibrated.

Apparatus for performing this method is also included in the scope of the invention.

BRIEF DESCRIPTION OF THE DRAWINGS

Embodiments of the invention will now be described, by way of example, with reference to the drawings, in which.

DETAILED DESCRIPTION OF THE INVENTION

Figure 1:
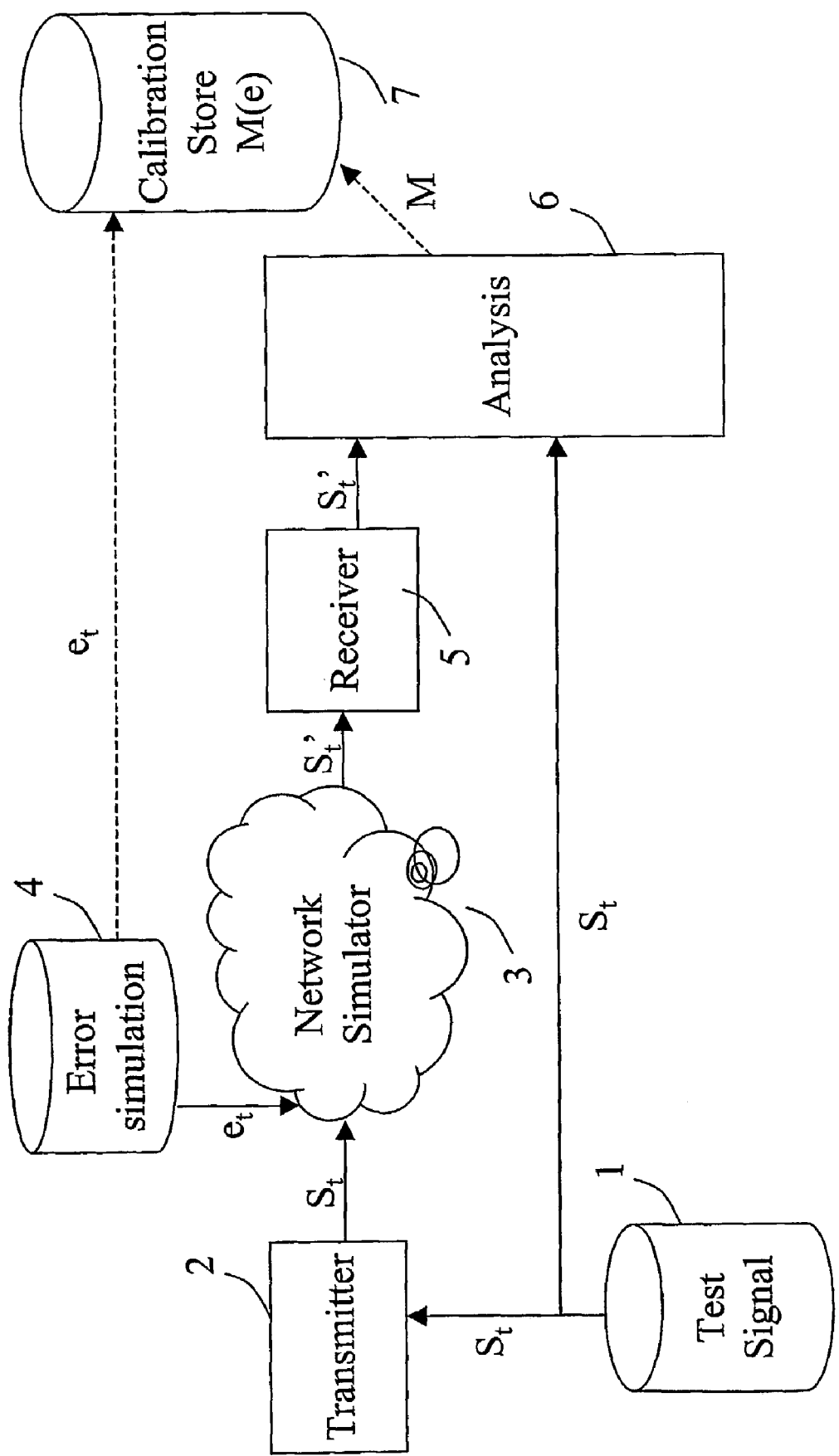
FIG. 1 illustrates diagrammatically a system configured to perform the calibration process according to the invention.

The calibration system illustrated in FIG. 1 has a test signal generator 1, which generates a predetermined signal $S_t$ (such as that disclosed in European Patent 0705501) for transmission by a transmitter 2 over a network simulator 3 to a receiver 5. A fault simulator 4 is arranged to control the simulator 3 such that it imposes deliberate error conditions $e_t$ on signals $S_t$ transmitted through the simulator 3, such that the receiver 5 receives a degraded signal $S_t'$. The error conditions simulated are of a type readily measured objectively, such as different values of bit error rate, packet delay variation ("jitter"), and packet loss characteristics (number of packets lost and any pattern to them). However, their subjective significance depends on a number of factors, including the type of transmitter and receiver used, and is not known at this stage of the process.

An analysis unit 6 is provided to compare the original signal $S_t$ with the degraded signal $S_t'$ received by the receiver 5. The analysis unit 6 operates according to the principles described in the aforementioned European patent 0647375 to generate a measure M of the subjective importance of the errors detected. The subjective importance depends on a number of factors. Empirical "Mean Opinion Scores" given by human subjects to degraded signals show a highly complex relationship with the incidence of errors in the signal.

Figure 2:
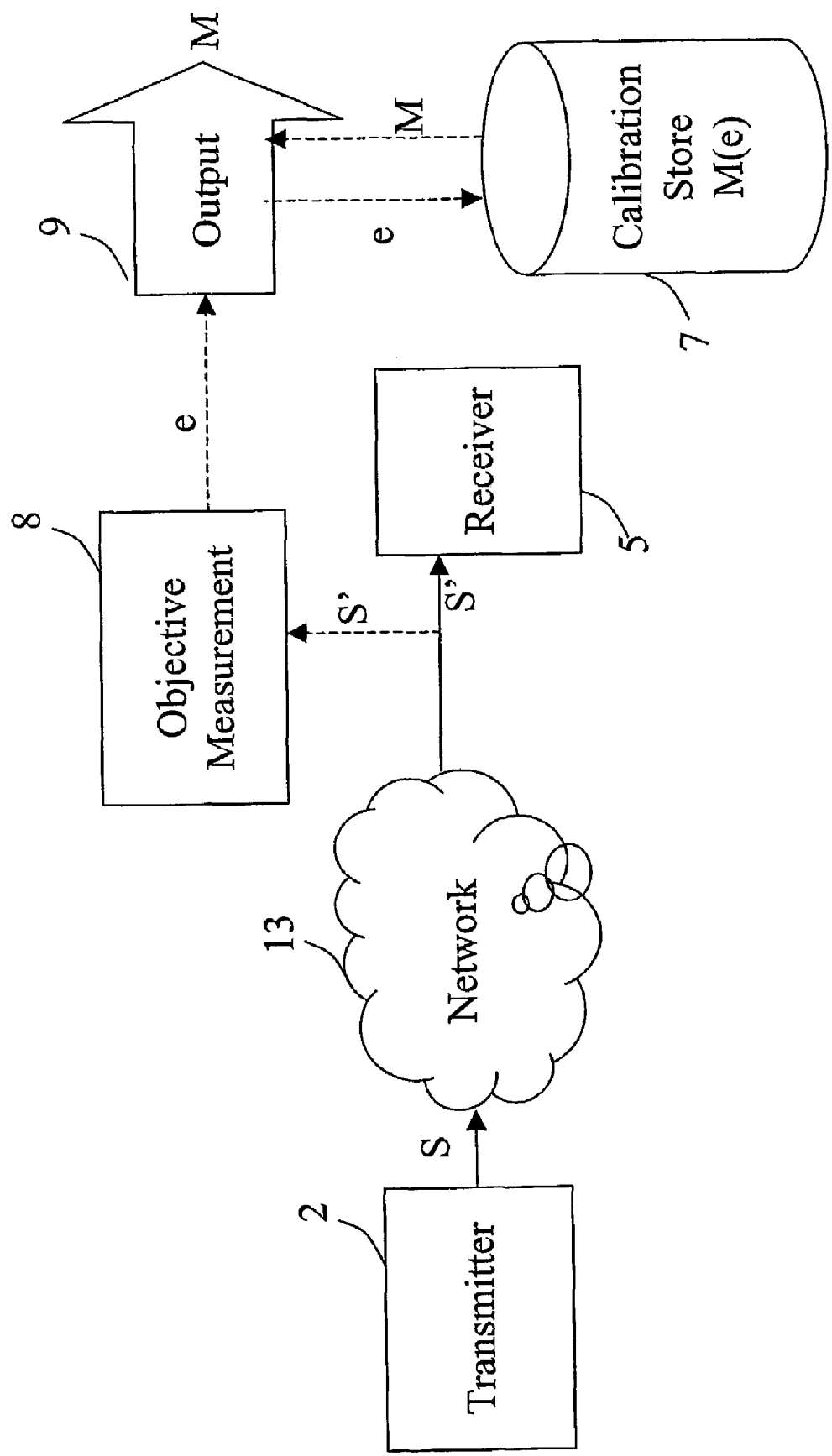
FIG. 2 illustrates diagrammatically a system configured to perform the in-service measurement process according to the invention.

The output M corresponding to each error condition $e_t$ simulated in the network simulator 3 is passed to a store 7 which compiles a set of error conditions e and associated subjective error values M(e). These values may be stored in the form of a "look-up table". Alternatively, an empirical relationship between the error conditions e and associated subjective error values M(e) may be determined using known techniques, such as neural networks, or radial basis function networks, so that the subjective error M(e) can be defined as a mathematical function of the measured values of packet loss, jitter etc, and this function can be stored. The look up table of stored values, or subjective error function M(e), can then be used on a real network 13, as is illustrated in FIG. 2. The results will be consistent provided that the transmitter 2 and receiver 5 used are similar to those (2,5) used in the calibration process.

Unlike the calibration process, the transmitter 2 transmits a live signal S whose true nature cannot be determined at the receiver 5, as it may have been corrupted by the network 13 under test. The network 13 imposes degradations on the signal S such that the output to the receiver 5 is a degraded version S'.

This degraded signal S' is analysed by a measurement system 8 to derive an objective measure "e" of the errors imposed by the network simulator 3, for example the bit error rate, packet delay variation ("jitter"), and packet loss characteristics (number of packets lost and any pattern to them). It will be appreciated that the measure "e" will generally be a vector property ($e_a$, $e_b$, $e_c$, . . . ) as it depends on a plurality of independant variables, namely the magnitudes of the various objective error conditions such as bit error rate, bit loss rate, and so on). Consequently the values of M(e) have to be determined over a multi-dimensional search space.

This measure "e" is fed to an output device which retrieves from the calibration store 7 the corresponding value M(e) for output as the subjective degradation. Depending on the form in which the data is stored, this may require retreival of an entry from a "look-up" table or calculation of a value M(e) for given values of "e".

The part of the transmission path upstream of the point in the network 13 or the simulator 3 where the known faults are injected (namely transmitter 2) may also cause errors in an end to end signal, which may interact with errors imposed by the network 3, 13, either to make the subjective error worse or to mask it. Any effects caused by elements downstream of the measurement point in the network 13 may also affect the subjective error perceived by the end user, for example if error correction software is provided. The process described above only identifies the effects of errors introduced by the network 3, 13, between the point where simulated faults are injected in the network simulator and the point in the real network where the objective measurement 8 are taken. However, calibration will be effective if the end-to-end systems are identical before and after these two points, and the network simulator introduces no errors of its own other than those generated by the fault simulator.

For example, any degradation caused by the transmitter 2 will affect the score M generated by the analysis unit 6, as will any degradation or improvement (using error correction software) caused by the receiver. Thus the score M is a measure of the subjective effect on the signal transmitted through the whole system 2,3,5 (2,13,5) as a function only of those errors imposed by the network 3,13. However, provided the transmitter 2 and receiver 5 used in the real test are similar to those 2,5 used in the calibration process the subjective effect will be accurately modelled.

In a typical application, the transmitter 2 is a cellular telephone, the receiver 5 is part of the fixed part of the cellular system and its connection to the other party to a call, and the system under test 13 is the connection, including the radio link, by which the transmitter 2 and fixed part 5 communicate with each other. For any such system the nature of the transmitter 2 can be known (e.g. make and model of cellular telephone), as can the identity of the receiver system 5. A set of calibration values M(e) appropriate to this combination can be retrieved for use when this combination is in use. If a mobile telephone of a different type makes contact with the network 13, or the original mobile telephone moves to a different base station 5, a different set of calibration values generated using this new combination may be retrieved from the store 7.

If, for a series of values of "e", the value of M(e) does not vary by much, the system may elect to increase the incremetal value between each value of "e". Conversely, if M(e) varies by a great amount between each value of "e", the system may reduce the incremental value, or add data for values of "e" interpolated between those already taken. This allows the measurements to be concentrated on the areas of the data space of the greatest interest.

The invention claimed is:

1. A method of measuring the perceptibility of degradations caused to signals transmitted over a transmission medium comprising the steps of;
   generating a test signal;
   generating one or more predetermined transmission degradation conditions;
   subjecting the test signal to the or each transmission degradation condition;
   using an objective measure to measure the degree to which the or each transmission degradation condition is perceptible to the human perceptual system;
   generating therefrom a data set for converting transmission degradation conditions into values of perceptibility; and
   storing the data set so generated.

2. A method according to claim 1, comprising the further steps of:
   receiving a signal from a transmission medium;
       identifying transmission degradation conditions in the received signal;
       retrieving from the stored data set a value of perceptibility associated with the transmission degradation condition so identified;
       thereby generating a measure of the perceptibility of the degradation in the received signal.

3. A method according to claim 1 wherein the transmission degradation conditions include values of bit error rate.

4. A method according to claim 1 wherein the transmission degradation conditions include values of packet delay variation.

5. A method according to claim 1 wherein the transmission degradation conditions include packet loss characteristics.

6. A method according to claim 1 wherein values of perceptibility are selected according to the nature of elements of the transmission path between which the transmission medium under test is interposed.

7. A method according to claim 1 in which an initial plurality of degradation conditions are imposed on the system, and further degradation conditions are then selected according to the degree of variation in the resulting perceptibility measurement values.

8. A method according to claim 7, in which values of objective properties are identified for which a predetermined variation in value generates relatively large differences in the resulting perceptibility measurement values, and additional measurements of perceptibility value are taken for neighbouring values of the objective properties.

9. A method according to claim 7, in which perceptibility values are measured for a sequence of degradation conditions, and the degree of variation between the degradation conditions in the members of the sequence is varied as the sequence progresses according to the variations in the measured perceptibility values.

10. A method according to claim 7 wherein additional measurements are taken between the incremental steps to identify local maxima and minima.

11. Apparatus for measuring the perceptibility of degradations caused to signals transmitted over a transmission medium comprising;
    test signal generation means (1) for generating a test signal ($S_t$);
    fault simulation means (4) for generating one or more predetermined transmission degradation conditions ($e_t$);
    network simulation means (3) for subjecting the test signal ($S_t$) to the or each transmission degradation condition ($e_t$);
    objective analysis means (6) for measuring the degree (M(e)) to which the or each transmission degradation condition (et) is perceptible to the human perceptual system;
    means for generating a data set for converting one or more transmission degradation conditions (et) to respective values of perceptibility $(M)^1$; and
    data storage means (7) for storing the data set so generated.

12. Apparatus according to claim 11, further comprising:
    measurement means (8) for receiving a signal (5') from a transmission medium (13) and identifying transmission degradation conditions (e) in the received signal (5');
    retrieval means (9) for retrieving from the data set in the data storage means (7) a value of perceptibility (M) associated with the transmission degradation conditions (e) so identified.

* * * * *